United States Patent [19]

Andrew et al.

[11] Patent Number: 5,725,724
[45] Date of Patent: Mar. 10, 1998

[54] PLASTIC PIPE FACER FOR BUTT FUSION APPLICATION

[75] Inventors: Bill Dean Andrew; Richard Leroy Goswick, both of Tulsa, Okla.

[73] Assignee: TDW Delaware, Inc., Wilmington, Del.

[21] Appl. No.: 746,926

[22] Filed: Nov. 18, 1996

Related U.S. Application Data

[60] Provisional application No. 60/023,100, Aug. 1, 1996.

[51] Int. Cl.⁶ ............................................. B32B 31/00
[52] U.S. Cl. ..................... 156/535; 156/304.2; 156/510; 83/59
[58] Field of Search ....................... 156/304.1, 304.2, 156/304.6, 391, 499, 510, 523, 535; 83/59

[56] References Cited

U.S. PATENT DOCUMENTS

| | | | |
|---|---|---|---|
| 3,013,925 | 12/1961 | Larsen | 156/535 X |
| 3,400,030 | 9/1968 | Burger | 156/535 X |
| 3,729,360 | 4/1973 | McElroy | 156/499 |
| 3,793,119 | 2/1974 | Province | 156/499 |
| 3,846,208 | 11/1974 | McElroy | 156/499 |
| 4,008,118 | 2/1977 | Wesebaum et al. | 156/499 |
| 4,071,395 | 1/1978 | McElroy | 156/499 |
| 4,227,067 | 10/1980 | McElroy | 219/243 |
| 4,352,708 | 10/1982 | McElroy | 156/378 |
| 4,401,497 | 8/1983 | Warthmann | 156/267 |
| 4,484,975 | 11/1984 | McElroy | 156/503 |
| 4,533,424 | 8/1985 | McElroy | 156/378 |
| 4,640,732 | 2/1987 | Stafford | 156/358 |
| 4,684,430 | 8/1987 | Handa et al. | 156/366 |
| 4,957,570 | 9/1990 | Jenkins et al. | 156/64 |
| 4,990,209 | 2/1991 | Rakes | 156/351 |
| 5,013,376 | 5/1991 | McElroy, II et al. | 156/64 |
| 5,078,827 | 1/1992 | Calderwood | 156/503 |
| 5,241,157 | 8/1993 | Wermelinger et al. | 219/243 |
| 5,290,387 | 3/1994 | Kramer et al. | 156/359 |
| 5,464,496 | 11/1995 | Wilson et al. | 156/499 |

FOREIGN PATENT DOCUMENTS

| | | | |
|---|---|---|---|
| 298551 | 4/1928 | United Kingdom | 83/59 |

Primary Examiner—David A. Simmons
Assistant Examiner—Paul M. Rivard
Attorney, Agent, or Firm—Head, Johnson & Kachigian

[57] ABSTRACT

A facer for use with a plastic pipe butt fusion machine, the machine being of the type that supports two lengths of plastic pipe in spaced apart, end-to-end relationship. The facer has a housing supportable to a butt fusion machine that includes a driven gear rotatably with first and second paralleled facer plates affixed to opposed surfaces of the driven gear. Each facer plate has shapers that, when forced against the ends of plastic pipe shave off portion of the pipe so that the ends become uniform and perpendicular to the longitudinal axis of the pipe. A motor is supposed to the housing and includes a drive shaft having a drive gear that is coupled to the driven gear by a chain. An overriding clutch connects the motor drive shaft to the drive gear. A crank is removably connectable to the drive gear so that the drive gear can be rotated manually by means of the crank and when so rotated, the drive gear freely rotates upon the motor shaft as permitted by the overriding clutch so that the motor shaft is not rotated thus permitting use of the facer when electricity is not available, or under conditions wherein the possibility of a potentially explosion igniting spark must be avoided.

11 Claims, 3 Drawing Sheets

PLASTIC PIPE FACER FOR BUTT FUSION APPLICATION

CROSS-REFERENCE TO RELATED APPLICATIONS

This application claims the benefit of and incorporates by reference prior filed Provisional Application No. 60/023,100 filed 08/01/96 entitled "Plastic Pipe Facer For Butt Fusion Application".

BACKGROUND OF THE INVENTION

Plastic pipe is commonly used today in gas and water piping systems as well as other industrial applications. Thermoplastic pipe, such as made of polyethylene, is superior to metal pipe in many applications since it is not subject to rust, corrosion or electrolysis and when buried in the ground has exceedingly long life. Another of the important advantageous of the use of thermoplastic pipe is that lengths of pipe can be easily joined end-to-end by heat fusion. That is, the ends of plastic pipe can be heated and, while in molten or semi-molten state, forced into contact with each other. When the molten plastic at the ends of adjacent lengths of pipe solidifies, fusion quickly takes place. The fusion joint is essentially of the same strength as the pipe itself. This process is called "butt fusion".

Machines for butt fusion of plastic pipes have long been used. A butt fusion machine typically includes a frame that supports a first clamp for holding the end portion of one length of plastic pipe and a second clamp for holding a second length of plastic pipe. At least one of the clamps is moveable. The two lengths of pipe to be joined are clamped into position with their ends spread apart. To prepare the pipe to be butt fused, it is important that the ends of the pipe be planar, with the plane of each end perpendicular to the pipe axis. For this reason, a device known as a "facer" is positioned between the two lengths of pipe. The facer has opposed cutting surfaces. When the lengths of pipe are positioned so that the opposed ends are in contact with the opposed facing surfaces of the facer machine, the facer is activated to rotate knives against each of the opposed ends.

To speed up the operation it has been a practice to employ facers that are electrically driven. However, in some applications, such as when pipe is installed in a hazardous environment it can be unsafe to use electrical energy to activate the pipe facer. Under conditions in which gas is present, it is important that steps be taken to preclude the possibility of creating a spark that could ignite an explosion. Under these adverse conditions the best way to operate a facer is to manually rotate the facer blades, however, if manual operation rotates the electric drive motor the possibility of sparks is still a concern. For this reason, in some instances others have suggested removing the brushes from the electric motor that drives a pipe facer before manually operating the facer.

The present invention provides a system that can be used electrically or manually and in an arrangement wherein it is not necessary to disconnect any portion of the device in order to operate it manually and wherein the manual operation does not cause rotation of an electric motor or other apparatus that could cause an inadvertent spark.

PRIOR ART

For background information regarding butt fusion machines, reference can be had to the following previously issued United States Patents:

| U.S. Pat. No. | INVENTOR | TITLE |
|---|---|---|
| 3729360 | McElroy | Portable Thermoplastic Pipe Fusion Apparatus |
| 3793119 | Province | Facing Tool For Plastic Pipe Fusion Apparatus |
| 3846208 | McElroy | Combination Pipe Fusion Unit |
| 4008118 | Weesbaum et al | Butt Fusion Machine |
| 4071395 | McElroy | Apparatus For Creating Segmented Polyethylene Pipe Turns |
| 4227067 | McElroy | Heater Adapter For Making Polyethylene Pipe Connections |
| 4352708 | McElroy | Defined Force Fusion Machine For Joining Plastic Pipe |
| 4401497 | Warthmann | Method and Apparatus For Butt Welding Of Plastic Pipes Of Large Diameter |
| 4484975 | McElroy | Hand Held Apparatus For Joining Small Diameter Plastic Pipe |
| 4533424 | McElroy | Pipe Fusion Apparatus With Load Cell For Attaching Side Wall Fittings |
| 4640732 | Stafford | Apparatus For Fusion Joining of Thermoplastic Pipes |
| 4684430 | Handa et al | Apparatus For Fusibly Interconnecting Thermoplastic Pipes |
| 4957570 | Jenkins et al | Butt-Welding Of Pipes |
| 4990209 | Rakes | Self Propelled Pipe Fusion Machine |
| 5013376 | McElroy II et al | Programmable Computer Controlled Pipe Fusion Device |
| 5078827 | Calderwood | Pneumatic Mandrel For Machining And Fusion Of Plastic Pipe |
| 5241157 | Wermelinger et al | Arrangement For Butt-Welding Plastic Material Components |
| 5290387 | Kramer et al | Device For Welding Tubular Components Of Plastics Material |
| 5464496 | Wilson et al | Plastic Pipe Butt Fusion Machine |

DESCRIPTION OF THE DRAWINGS

FIG. 2 discloses the essence of the invention and provides a method of using both electrical and manual operating modes in an arrangement wherein in the manual mode it is not necessary to disconnect any portion of the motor or other electrical apparatus.

DETAILED DESCRIPTION OF THE PREFERRED EMBODIMENTS

Figure 1:
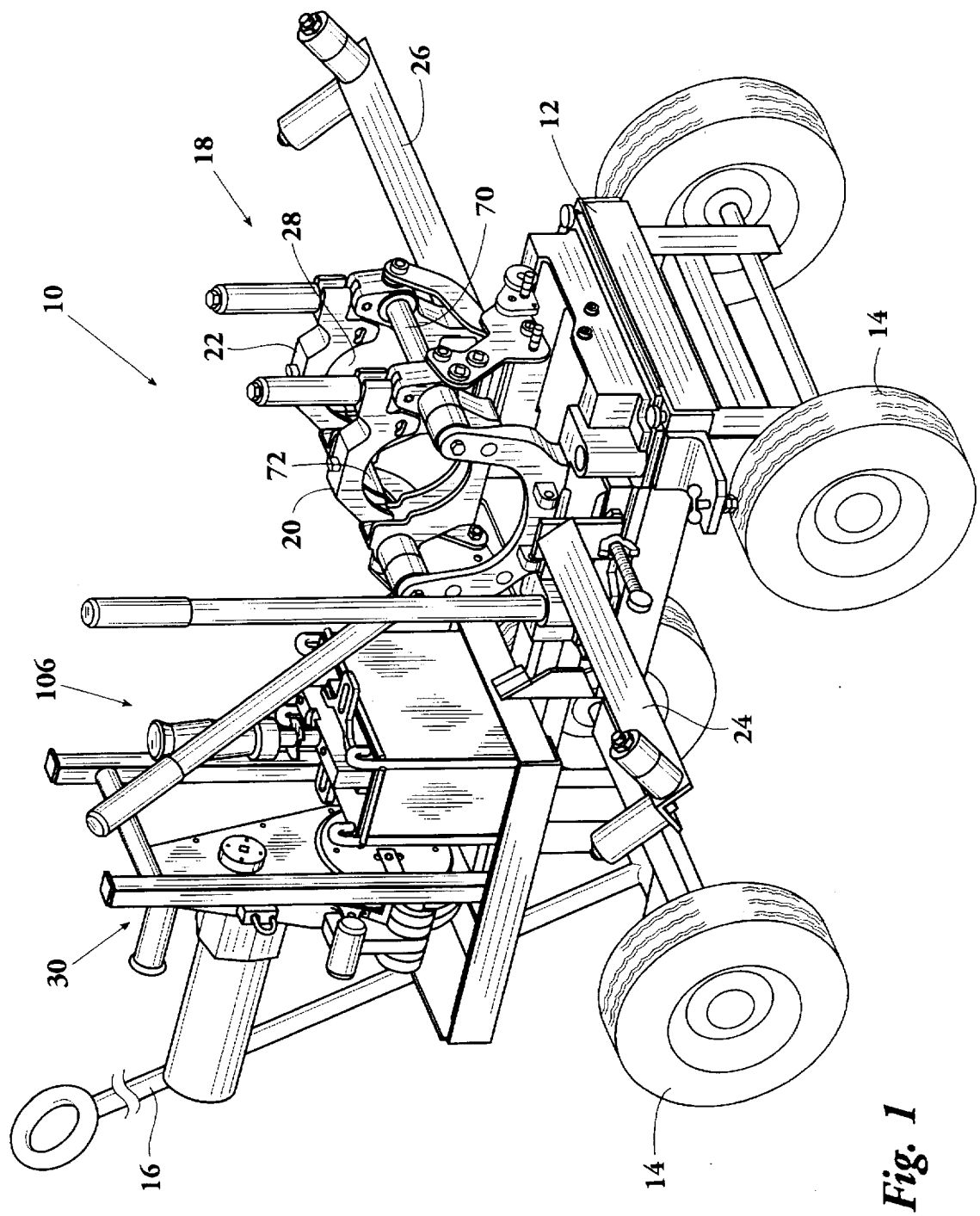
FIG. 1 is a isometric view of a butt fusion apparatus for fusing two plastic pipes end-to-end and illustrates a cart on which the butt fusion machine is positioned, the cart including means for transporting a facer for cleaning and shaping the ends of the pipe to be fused. The pipe facer is the subject of this invention.

FIG. 1 shows the environment in which a pipe facer is used. A cart, generally indicated by the numeral 10, has a frame 12 and wheels 14, the cart 10 being pulled by a tongue 16, the cart being of the type that is useful for moving a butt fusion machine from place to place for fusing together two lengths of thermoplastic pipe. Resting on cart frame 12 is a butt fusion machine generally indicated by the numeral 18. Machine 18 is not directly relevant to the present invention but illustrates the environment in which the invention is employed. The butt fusion machine 18 has spaced apart clamps 20 and 22 designed to attach to two opposed lengths of plastic pipe. By means of extensions 24 and 26, lengths of plastic pipe (not shown) may be supported in machine 18. Between clamps 20 and 22 is a space 28 in which opposed ends of two plastic pipes can be positioned.

Before fusing opposed ends of plastic pipes, each end must be cleaned and shaped so that it is in a plane perpendicular to the pipe axis. For this reason, a facer is employed, a facer being generally indicated by the numeral 30. In FIG. 1, facer 30 is shown in a storage position on cart 10—not in the position in which it is actually used. To provide a planar face on opposed ends of plastic pipe, facer 30 is manually lifted from its storage position and inserted into space 28 between clamps 20 and 22. While in space 28, lengths of plastic pipe are moved towards each other so that the opposed ends of the pipe contact opposed ends of the facer. The facer is then actuated to clean and shape the ends of the plastic pipe.

Facer 30 can be actuated electrically or manually in a way to be described subsequentially.

It is understood that facer 30 can be used with butt fusion machines that have appearances completely different than that of butt fusion machine 18 as shown in FIG. 1. FIG. 1 is illustrated only for the purpose of establishing an example of an environment in which the facer is used and FIG. 1 is not intended to imply a limitation to the use of the racer which will now be described with reference to FIGS. 2 and 3.

For further background information regarding butt fusion machines and the environment in which facers are employed, reference may be had to U.S. Pat. No. 5,464,496 entitled "Plastic Pipe Butt Fusion Machine", issued Nov. 7, 1995. This patent is incorporated herein by reference.

Figure 2:
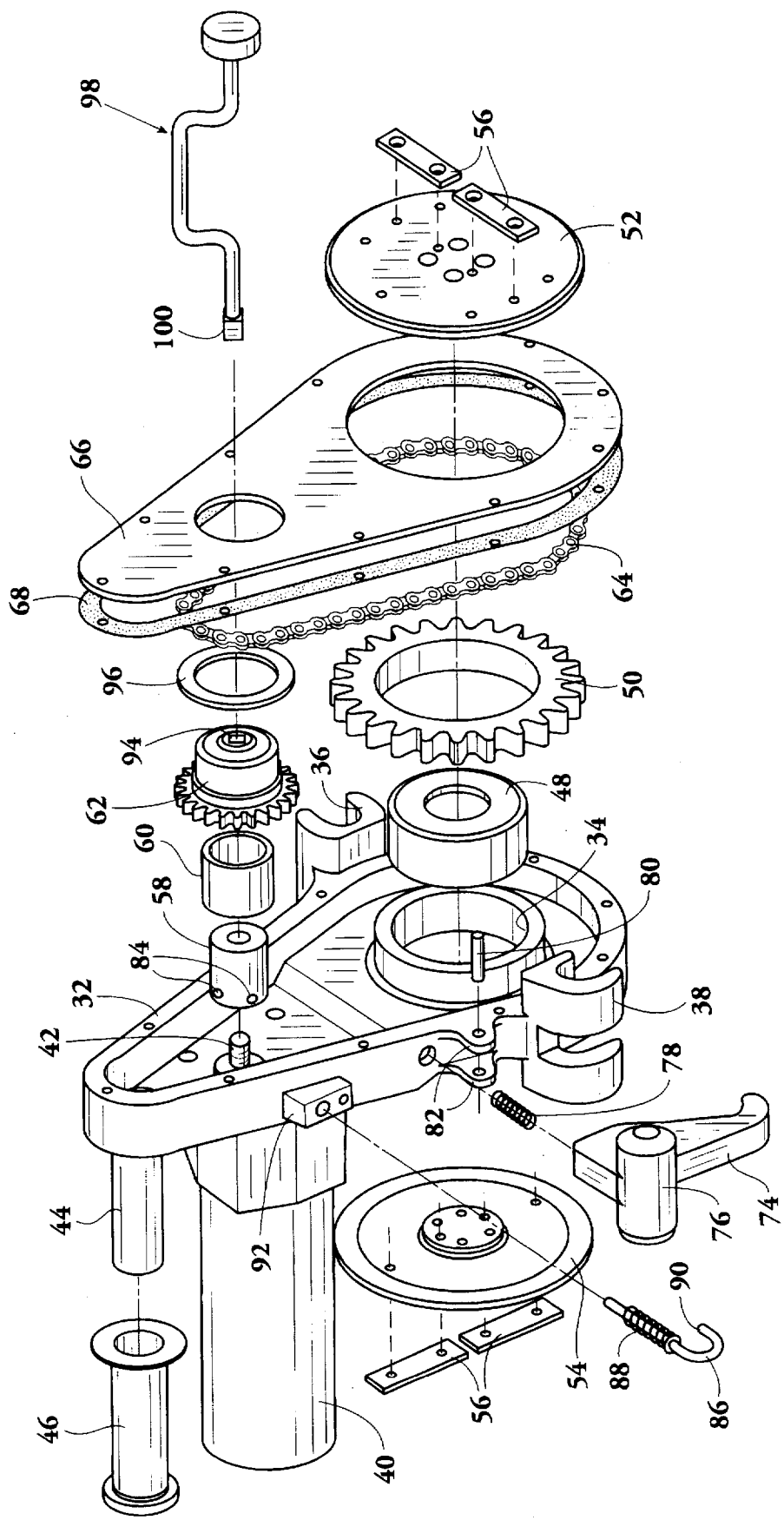
FIG. 2 is an isometric exploded view of a facer for use in the butt fusion apparatus of FIG. 1.

The facer illustrated in FIG. 2 of the present disclosure includes a housing 32 that may typically be made of cast steel or aluminum. Housing 32 has a large diameter bearing opening 34 and integral opposed support bosses 36 and 38.

Supported to housing 32 is a drive motor 40 which may include, as an integral part thereof, a reduction gear. Drive motor/reduction gear 40 has an output shaft 42. Drive motor 40 may typically be of the type that will accept a wide voltage range of AC or DC voltages and accordingly, drive motor 40 frequently includes a commutator against which brushes rest (not seen). Drive motors of the type indicated by the numeral 40 typically have the propensity to at least occasionally generate sparks. If the facer 30 is used in an environment wherein gas may be present, electrical sparks can be hazardous.

Extending from housing 32 is a handle 44 by which the facer is moved from storage into operation position and vice versa. Handle 44 receives a grip sleeve 46.

Positioned within opening 34 is a bearing 48 that supports driven sprocket 50. Affixed to sprocket 50 is a front plate 52 and, on the reverse side of the sprocket, a rear plate 54.

Facer blades 56 are attached to the outer surface of front plate 52 and, in like manner, to the outer surface of rear plate 54.

Affixed to motor drive shaft 42 is a shaft adaptor 58 and received on the shaft adaptor is clutch 60. A drive sprocket 62 is received on clutch 60. A chain 64 loops around drive sprocket 62 and driven sprocket 50.

Cover 66 closes housing 32. Gasket 68 serves to seal the interior of the housing.

Referring momentarily back to FIG. 1, the butt fusion machine includes opposed paralleled cylindrical shafts 70 and 72, shaft 72 being visible only through the opening in clamp 20. Shafts 70 and 72 provide support for clamps 20 and 22 and permit at least one of the clamps to move back and forth towards the other. Further, shafts 70 and 72 support facer 30 when the facer is positioned in opening 28. As previously mentioned with respect to FIG. 2, housing 32 includes support bosses 36 and 38. These bosses are configured to be positioned on shafts 70 and 72 so that facer 30 is free to slide on the shafts so that when opposed lengths of pipe are moved towards each other, the facer self-centers between the pipes and applies equal cutting force to the opposed ends to clean and shape the ends.

In order to removably secure facer 30 in position on shafts 70 and 72, a locking member 74 is employed (See FIG. 2), the member having a downwardly extending portion that loops under one of the shafts when the facer is in operating position. Locking member 74 has a handle portion 76. Upward movement on handle portion 76 pivots the locking member and withdraws the lower extending portion 74 from underneath one of the shafts to allow racer 30 to be removed. Spring 78 normally urges the member 74 into locking position. Locking member 74 is pivoted about a pin 80 that extends through openings in bosses 82 formed on the exterior of housing 32.

Figure 4:
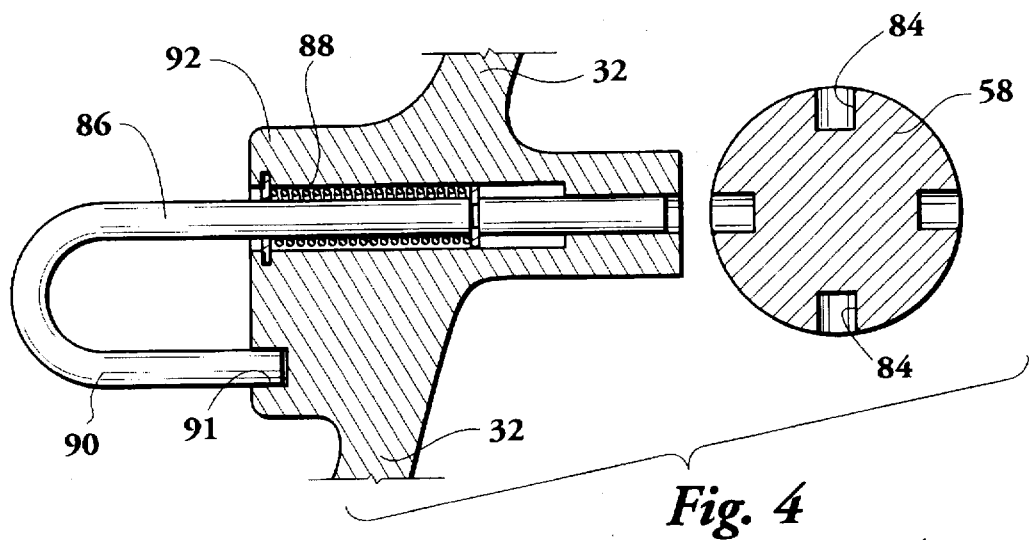
FIG. 4 is an enlarged cross-sectional view of a portion of the facer housing showing a slidable locking pin that can be used to lock the motor shaft against rotation when the facer is manually operated.
Figure 5:
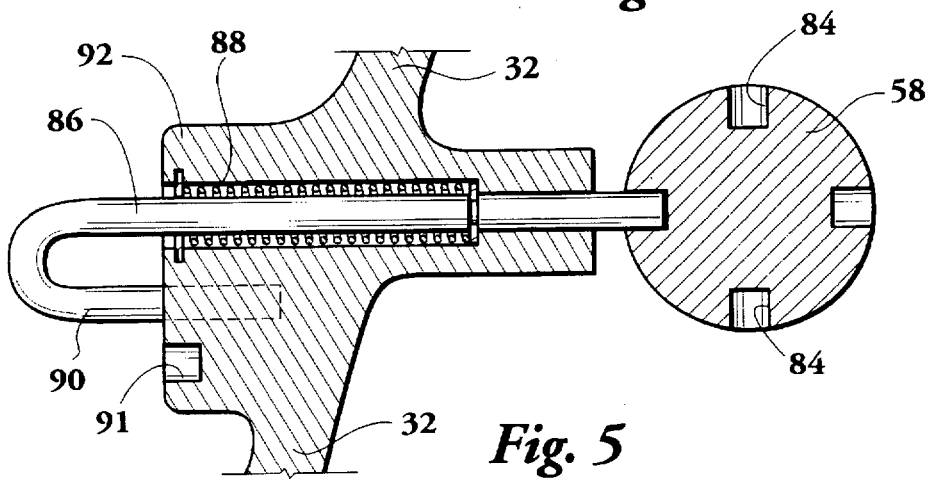
FIG. 5 is the view of FIG. 4 showing the locking pin in the locking position.

Shaft adapter 58 has, on its exterior periphery, spaced apart openings 84. As seen in FIGS. 4 and 5, lock pin 86 is urged inwardly by spring 88 so the inner end of the locking pin can extend within an opening 84. Lock pin 86 has an integral U-shaped portion 90 that, when in position in a recess 91 in boss member 92, holds the lock pin out of engagement with shaft adapter 58.

When the inner end of lock pin 86 extends within an opening 84 in shaft adapter 58 motor shaft 42 is locked against rotation. This prevents drive motor 40 from rotating and thereby eliminates the possibility that inadvertent rotation of motor 40 could cause a spark.

Drive sprocket 62 has, in its outer end, a recess 94 that is of non-circular cross-sectional shape, such as a square cross-section. A seal 96 received on drive sprocket 62 helps to close the interior of housing 32.

A crank or wrench 98 is used to manually actuate racer 30. For this purpose, crank 98 has an inner end 100 that fits into recess 94 within drive sprocket 62.

Figure 3:
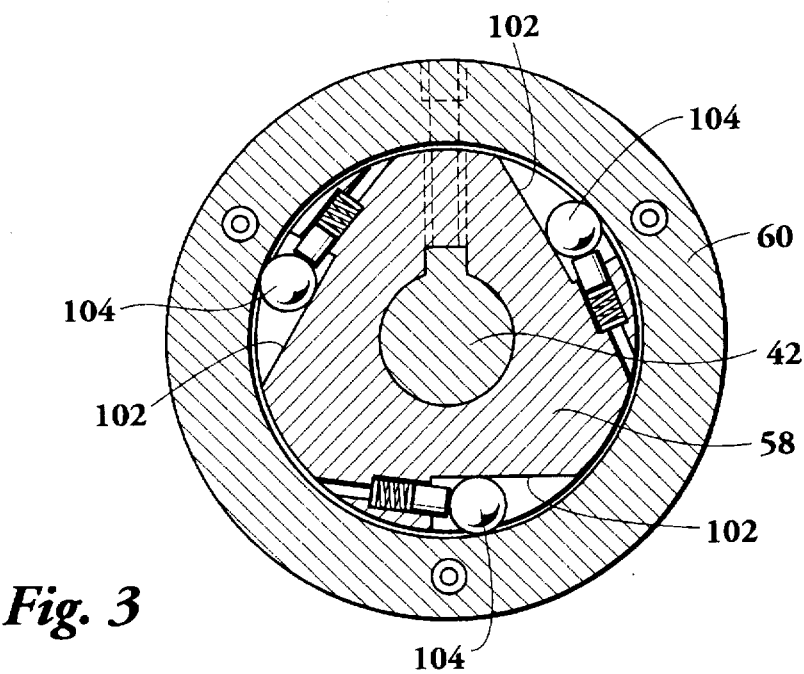
FIG. 3 is a diagrammatic view of a section of a overrunning clutch of the type employed in the facer of FIG. 2.

FIG. 3 is a cross-sectional view of an exemplary embodiment of shaft adapter 58 mounted on motor shaft 42. Received on shaft adapter 58 is clutch 60. Drive sprocket 62 is received on clutch 60 but is not shown in FIG. 3.

Formed on the outer surface of shaft adapter 58 as shown in FIG. 3 are three inclined surfaces 102 each receiving a ball 104. When motor shaft 42 is rotated clockwise, as seen in FIG. 3, shaft adapter 58, being attached to it, is likewise rotated clockwise causing balls 104 to move on inclined surfaces 102 to lock the rotation of shaft adapter 58 to clutch 60. Since drive sprocket 62 is secured on the exterior of clutch 60 it is rotated.

The rotation of drive sprocket 62 moves chain 64 and thereby driven sprocket 50 to rotate front and rear plates 52 and 54 having facer blades 56 thereon so that the ends of plastic pipe forced against plates 52 and 54 will be shaped to provide surfaces that are perpendicular to the longitudinal axii of the pipes.

When the facer is used in an environment where sparks from motor 40 may be hazardous, or if suitable electrical energy is not available, the facer can be operated manually. To insure that no possibility of the generation of sparks arises, lock pin 86 is moved so that U-shaped portion 90 is disengaged from recess 91 in boss member 92 allowing spring 88 to move the lock pin inwardly to engage an opening 84 in shaft adapter 58, as seen in FIG. 5. Once lock pin 86 enters an opening 84 the shaft adapter and therefore motor 40 are locked and cannot be rotated so that the possibility of generation of sparks by the rotation of the motor is eliminated. The facer can then be manually rotated by insertion of the square end 100 of crank 98 into recess 94 of drive sprocket 62. By rotating crank 98, the drive sprocket 62 and thereby driven sprocket 50 are rotated to plane the ends of thermoplastic pipe. The overrunning clutch, an example of which is shown in FIG. 3, permits clutch portion 60, to which drive sprocket 62 is secured, to rotate in a clockwise direction even while the shaft adapter 58 is fixed in a non-rotating position. This is so since balls 104 are moved on inclined surfaces 102 in the direction so that the balls easily slip in the widest portions of the recesses provided by inclined surfaces 102.

The type of overrunning clutch illustrated in FIG. 3 is exemplary of other type of overrunning clutches that can be employed in practicing the invention. Overrunning clutches are sometimes referred to as "free wheeling" clutches, a common example being the type of clutch that has been used in bicycle coaster brakes. Another type of overrunning clutch utilizes specially shaped rockers or "sprags" that are located between concentric circular races. This type is sometimes referred to as a "sprag" overrunning clutch. A third type of overrunning clutch may employ the arrangement wherein shaft adapter 58 has a toothed external peripheral surface that is engaged by one or more pawls secured to clutch 60, the pawls engaging the toothed structure to thereby rotate clutch 60 and drive sprocket 62 when the shaft adapter is rotated by motor 40 but which permits the drive sprocket 62 to be mechanically rotated when the shaft adapter and clutch are stationary.

Any one of these three examples of overrunning clutches would function satisfactorily for clutch 60 and the specific clutch employed depends upon commercial availability and price. However, at the time of preparation of this application, the preferred overrunning clutch is the "sprag" type.

After facer 30 has been employed for facing opposed ends of plastic pipes to be joined, it is removed from its position on shafts 70 and 72 of the butt fusion machine by manual engagement with handle 76 to pivot locking member 74. This allows the facer to be disengaged from shafts 70 and 72 and the entire facer assembly removed from the butt fusion machine. When cart 10 is employed, the facer may be returned to its stored position as illustrated in FIG. 1. A heater 106 is then moved from its storage space and inserted within space 28 of the butt fusion machine. The prepared ends of two lengths of plastic pipe are then forced against the heater to bring the ends to molten temperature, after which the heater is removed and the pipes, while the ends are in molten condition, are forced into contact with each other and held until the molten end portions solidify, thus butt fusing the pipes end-to-end. Cart 10 of FIG. 1 shows heater 106 in stored position adjacent to facer 30. This is by way of illustration only as heater 106 is not a part of the invention but is illustrated only to indicate the environment in which facer 30 is employed in a butt fusion operation.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A facer for use with a plastic pipe butt fusion machine of the type that supports two lengths of plastic pipe in spaced apart, end-to-end relationship, comprising:

a housing supportable to a butt fusion machine;

a driven gear rotatably supported by said housing;

first and second paralleled facer plates affixed to opposed surfaces of said driven gear, each facer plate having pipe end shapers thereon;

a motor having a drive shaft, the motor being supported to said housing;

an overriding clutch connected to said drive shaft;

a drive gear supported in rotational relationship with said overriding clutch and in force transmitting relationship with said driven gear; and a crank connectable to said drive gear whereby said drive gear and thereby said facer plates may be selectably rotated either manually, employing the crank, or by use of said motor.

2. A facer for use with a plastic pipe butt fusion machine according to claim 1 including:

a lock for selectably locking said motor drive shaft against rotation.

3. A facer for use with a plastic pipe butt fusion machine according to claim 1 wherein said drive gear and said driven gear are each in the form of a sprocket and are secured in force transmitting relationship by a chain.

4. A facer for use with a plastic pipe butt fusion machine according to claim 2 wherein said lock is a slidable member releasably engagable with at least one recess in rotational relationship with said motor drive shaft.

5. A facer for use with a butt fusion machine according to claim 1 including a shaft adapter affixed to said motor drive shaft, said overriding clutch being secured between the shaft adapter and said drive gear.

6. A facer for use with a butt fusion machine according to claim 5 wherein said shaft adapter has at least one recess on an exterior surface thereof and including a slidable lock member releasably engagable with said recess.

7. A facer for use with a butt fusion machine according to claim 1 wherein said drive gear has an axial, non-symmetrical recess in an exterior surface and wherein said crank has, at an outer end thereof, a matching non-symmetrical cross-sectional configuration.

8. A facer for use with a plastic pipe butt fusion machine according to claim 1 wherein said overriding clutch rotatably locks said drive gear to said shaft when said shaft is rotated and rotatably unlocks said drive gear from said shaft when said shaft is stationary and said drive gear is rotated.

9. A facer according to claim 1 wherein said housing is removably supported to a plastic pipe butt fusion machine.

10. A facer for use with a butt fusion machine of the type that supports two lengths of plastic pipe in spaced apart, end-to-end relationship, comprising:

a housing that rotatably supports a plate having opposed pipe shaping surfaces;

a motor secured to said housing and having a drive shaft;

a force transmitter connected to said motor shaft having a first mode and a second mode of operation, in said first mode said force transmitter serving to rotate said plate when said motor shaft is rotated and in the second mode permitting said plate to be rotated when said shaft is stationary; and a crank for manually actuating said force transmitter in said second mode whereby said plate may be rotated manually without the rotation of said motor shaft.

11. A facer according to claim 10 wherein said force transmitter includes an overriding clutch.

* * * * *

UNITED STATES PATENT AND TRADEMARK OFFICE
CERTIFICATE OF CORRECTION

PATENT NO. : 5,725,724
DATED : Mar. 10, 1998
INVENTOR(S) : Bill Dean ANDREW et al.

It is certified that error appears in the above-indentified patent and that said Letters Patent is hereby corrected as shown below:

Col. 3, line 34, delete "racer" and substitute --facer-- therefor.

Signed and Sealed this

Twenty-third Day of June, 1998

Attest:

BRUCE LEHMAN

Attesting Officer     Commissioner of Patents and Trademarks